United States Patent
Bourge et al.

(10) Patent No.: US 8,208,559 B2
(45) Date of Patent: Jun. 26, 2012

(54) DEVICE FOR PRODUCING PROGRESSIVE FRAMES FROM INTERLACED ENCODED FRAMES

(75) Inventors: Arnaud Bourge, Paris (FR); Françoise Groliere, Nogent sur Marne (FR); Yann Le Maguet, Paris (FR)

(73) Assignee: NXP B.V., Eindhoven (NL)

( * ) Notice: Subject to any disclaimer, the term of this patent is extended or adjusted under 35 U.S.C. 154(b) by 1625 days.

(21) Appl. No.: 11/579,886

(22) PCT Filed: May 11, 2005

(86) PCT No.: PCT/IB2005/051549
§ 371 (c)(1),
(2), (4) Date: Nov. 10, 2006

(87) PCT Pub. No.: WO2005/112468
PCT Pub. Date: Nov. 24, 2005

(65) Prior Publication Data
US 2007/0223886 A1    Sep. 27, 2007

(30) Foreign Application Priority Data
May 14, 2004   (EP) .................................. 04300280

(51) Int. Cl.
*H04N 11/02*   (2006.01)
(52) U.S. Cl. ................. 375/240.25; 375/240.01
(58) Field of Classification Search ............. None
See application file for complete search history.

(56) References Cited

U.S. PATENT DOCUMENTS

| | | | | |
|---|---|---|---|---|
| 5,020,120 A | * | 5/1991 | Weldy | 382/240 |
| 6,944,227 B1 | * | 9/2005 | Bober | 375/240.22 |

FOREIGN PATENT DOCUMENTS

| | | |
|---|---|---|
| EP | 1401209 A1 | 3/2004 |
| WO | 03010974 A | 2/2003 |

OTHER PUBLICATIONS

Zhu W et al: "Fast and Memory Efficient Algorithm for Down-Conversion of an HDTV Bistream to an SDTV Signal"; IEEE Transactions on Consumer Electronics; New York vol. 45, No. 1; Feb. 1999; pp. 57-61.
Ysie: "How to Deinterlace HQ to Progressive With Virtualdub"; VIDEOHELP.COM Forum Online; Dec. 24, 2003; HTTP://www.videohelp.com/forum/archive/t195227.html.
Song J. et al.: "Fast Extraction of Spatially reduced image sequences from MPEG-2 Compressed Video"; IEEE Transactions on Circuits and Systems for Video Technology, IEEE Inc., New York, US; vol. 9, No. 7, Oct. 1999, pp. 1100-1105.

\* cited by examiner

*Primary Examiner* — Christopher S Kelley
*Assistant Examiner* — Christopher Findley

(57) ABSTRACT

The present invention relates to a method of and a device for decoding a set of encoded frames at a first resolution (SD) so as to produce a set of output frames at a lower resolution (QCIF). Said device comprises: a partial decoding unit (DECp) for producing a first residual error field at a second resolution lower than the first one and a second residual error field at a third resolution lower than the first one based on the encoded frame; —a first predicting unit (PRED1) for producing a first motion-compensated field based on the first residual error field, on a first reference field (Fix1) and on a second reference field (Fix2); a first adder for combining the first residual error field with the first motioncompensated field so as to obtain a next first reference field (Fiy1); —a second predicting unit (PRED2) for producing a second motion-compensated field based on the second residual error field, on the first reference field and on the second reference field; a second adder for combining the second residual error field with the second motioncompensated field so as to obtain a next second reference field (Fiy2), the next second reference field corresponding to an output frame.

7 Claims, 5 Drawing Sheets

DEVICE FOR PRODUCING PROGRESSIVE FRAMES FROM INTERLACED ENCODED FRAMES

FIELD OF THE INVENTION

The present invention relates to a method of and a device for decoding a set of encoded frames at a first resolution so as to produce a set of output frames at a lower resolution, an encoded frame comprising an encoded first field interlaced with an encoded second field.

This invention may be used in video decoding applications and more particularly in applications where a compressed video bit-stream in interlaced format has to be displayed at a lower resolution on a progressive display. A typical application is the reception of DVB-T (for Digital Video Broadcast—Terrestrial) programs on a mobile device, such as a phone or a PDA (for Personal Digital Assistant).

BACKGROUND OF THE INVENTION

Low power consumption is a key-feature of mobile devices. Mobile devices now provide video encoding and decoding capabilities that are known to dissipate a lot of energy. So-called low-power video algorithms are thus needed.

As a matter of fact, accesses to an external memory such as SDRAM are a bottleneck for video devices. This is due both to power consumption issues, as memories are known to be the most power-consuming part of a system, and to speed limitation, due to the bandwidth of the exchanges between a central processing unit CPU and the memory.

In conventional video decoders, the motion compensation module needs many such accesses because it constantly points to blocks of pixels in so-called reference frames. To overcome this problem, the international patent application n° WO 03/010974 discloses a video decoding device wherein embedded resizing is used in conjunction with external scaling in order to reduce the computational complexity of the decoding.

Such a video decoding device is shown in FIG. 1 and comprises a first path made up of a variable length decoding block VLD, an inverse scan and inverse quantization block ISIQ, an 8×8 inverse discrete cosine transform block IDCT and a decimation block DECI. During operation, the VLD block decodes the incoming video bit-stream at a standard resolution SD to produce motion vectors MV and quantized transformed coefficients. The ISIQ block then inverse scans and inverse quantizes the quantized transformed coefficients received from the VLD block. Further, the IDCT block also performs filtering to eliminate high frequencies from the transformed coefficients. After performing the IDCT, the decimation block then samples the output of the 8×8 IDCT block at a predetermined rate in order to reduce the resolution of the video output frames OF being decoded.

As can be further seen, the decoder also includes a second path made up of the VLD block, a downscaling block DS, a motion compensation unit MC and a frame store MEM. During operation, the downscaling block DS reduces the magnitude of the motion vectors MV provided by the VLD block proportional to the reduction in the first path. This enables memory accesses to be reduced, as the motion compensation is performed at a reduced resolution to match the frames produced in the first path. In addition, the memory size is also reduced, as the stored memory frames are at reduced size.

However, the sequence of output frames is still interlaced, leading to unacceptable artifacts when rendering on a progressive display. Of course a de-interlacing unit could be inserted between the modified decoder and the RGB converter, but at the expense of complexity and memory transfers.

SUMMARY OF THE INVENTION

It is an object of the invention to propose a method of and a device for decoding an interlaced video sequence to produce a progressive downsized video sequence, which has a reasonable complexity.

To this end, the decoding device in accordance with the invention comprises:
  a partial decoding unit for producing a first residual error field at a second resolution lower than the first one and a second residual error field at a third resolution lower than the first one based on the encoded frame;
  a first predicting unit for producing a first motion-compensated field based on the first residual error field, on a first reference field and on a second reference field;
  a first adder for combining the first residual error field with the first motion-compensated field so as to obtain a next first reference field;
  a second predicting unit for producing a second motion-compensated field based on the second residual error field, on the first reference field and on the second reference field;
  a second adder for combining the second residual error field with the second motion-compensated field so as to obtain a next second reference field, the next second reference field corresponding to an output frame.

Similarly, the decoding method in accordance with the invention comprises the steps of:
  producing a first residual error field at a second resolution lower than the first one based on the encoded frame;
  producing a second residual error field at a third resolution lower than the first one based on the encoded frame;
  producing a first motion-compensated field based on the first residual error field, on a first reference field and on a second reference field;
  combining the first residual error field with the first motion-compensated field so as to obtain a next first reference field;
  producing a second motion-compensated field based on the second residual error field, on the first reference field and on the second reference field;
  combining the second residual error field with the second motion-compensated field so as to obtain a next second reference field, the next second reference field corresponding to an output frame.

As it will be explained in more detail hereinafter, the decoding solution in accordance with the invention includes an embedded resizing, which is adapted to directly output a progressive sequence, so that the de-interlacing is implicitly performed by the decoding loop. The cost of this solution in terms of computations, memory size and accesses is higher than that of the prior art video decoder without de-interlacing, but it provides a much better visual quality. The decoding solution in accordance with the invention is also cost-effective and far cheaper than the video decoding of the prior art combined with de-interlacing and achieves almost as good as this combination in terms of visual quality.

Beneficially, the partial decoding unit comprises in series an entropy decoding unit for producing a block of transformed coefficients at the second or third resolution from an encoded data block at the first resolution; an inverse quantizing decoding unit for producing a block of transformed coefficients at the second or third resolution from the block of quantized transformed coefficients; and an inverse transform unit for producing a block of decoded coefficients at the second or third resolution from the block of transformed coefficients. As a consequence, the inverse transform is smaller, which leads to a lower complexity of the decoding solution.

According to an embodiment of the invention, the second resolution is equal to the third resolution. Thanks to such a feature, the decoding solution provides a good visual quality.

According to another embodiment of the invention, the second resolution is variable depending on resources available on the decoding device. As a consequence, the decoding is fully efficient when full resources are available, such as battery level or CPU, and is still possible when low resources are available.

The present invention also relates to a portable apparatus including the decoding device and a screen to display the set of output frames.

Said invention finally relates to a computer program product comprising program instructions for implementing the decoding method in accordance with the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method of and a device for producing progressive frames from interlaced encoded frames. Said method can be applied to any video decoding device where frame sequences have to be stored in a memory. It is particularly interesting for reducing the size of the reference frame memory while keeping a sufficient overall visual quality of the decoded output frames.

Figure 1:
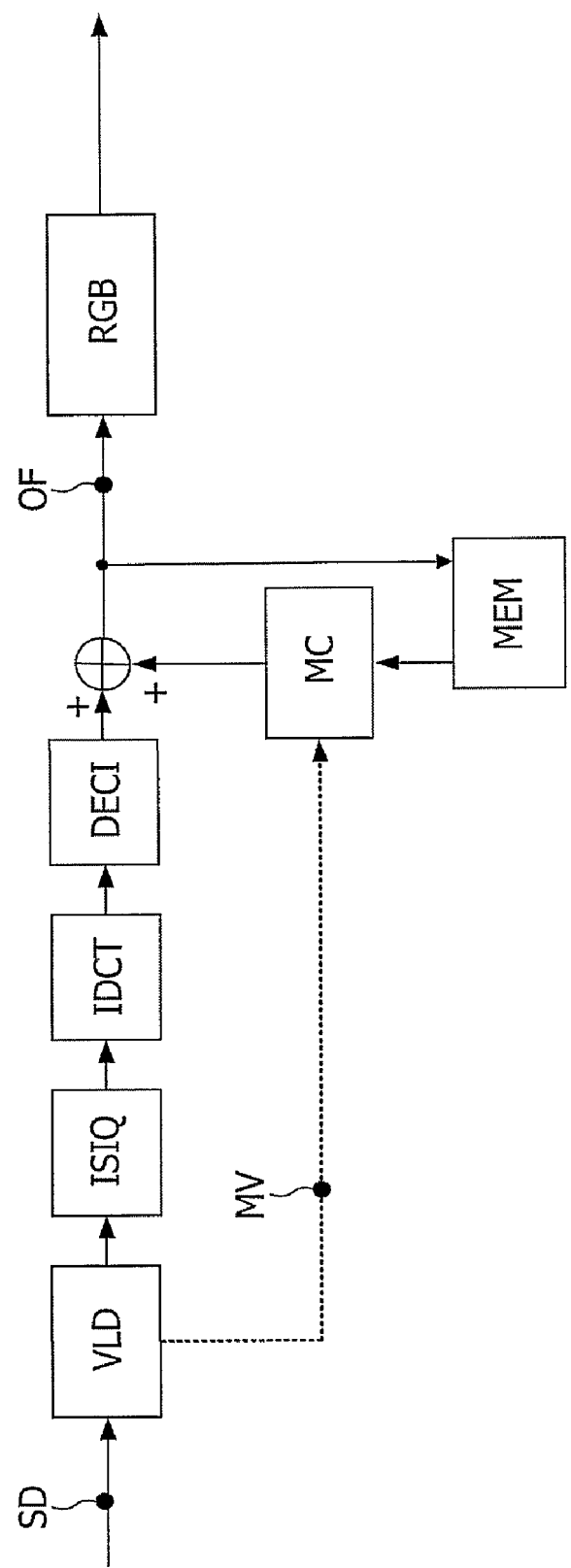
FIG. 1 shows a block diagram of a decoding device in accordance with the prior art.
Figure 2:
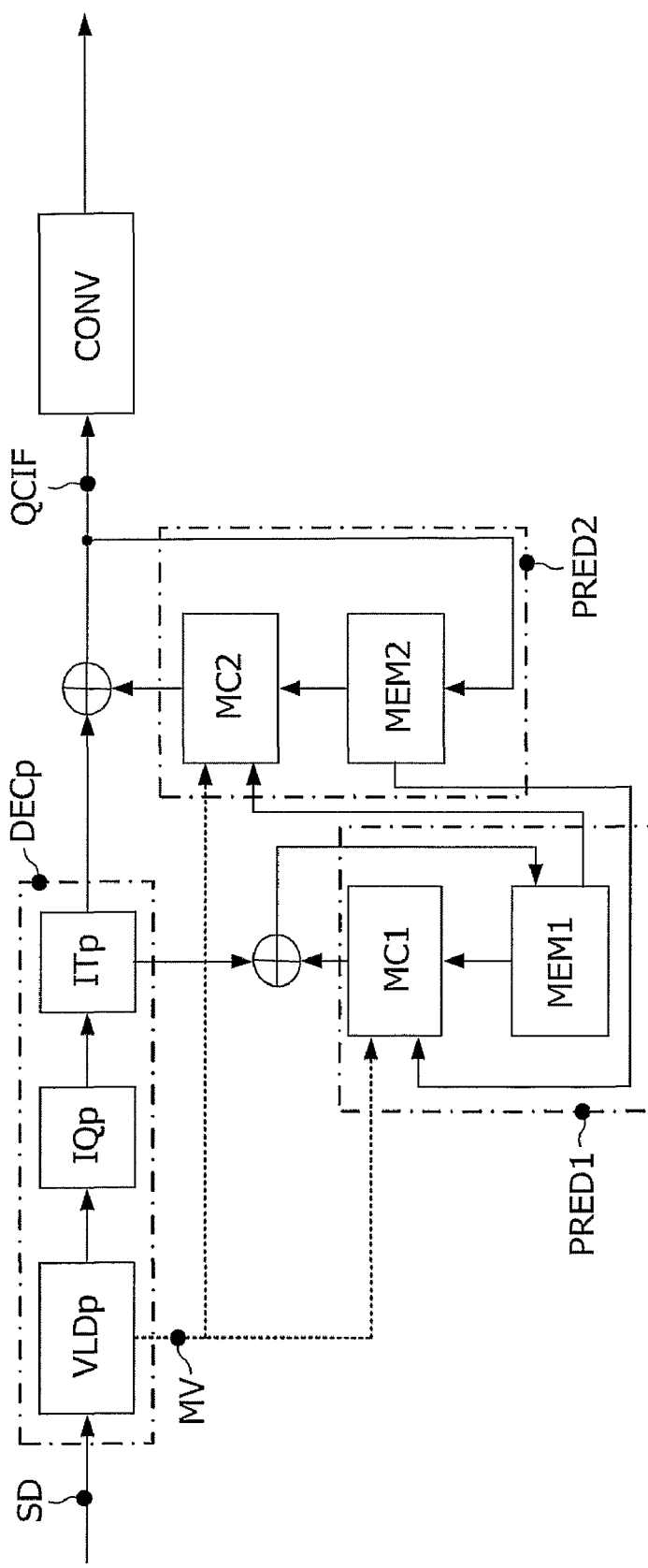
FIG. 2 shows a block diagram of an embodiment of a decoding device in accordance with the invention.

The principle of an embodiment of a decoding device in accordance with the invention is depicted in FIG. 2.

Such a decoding device comprises a partial decoding unit DECp for producing a first residual error field at a second resolution lower than the first resolution and a second residual error field at a third resolution lower than the first one, both residual error fields being produced based on the encoded frame. More precisely, an encoded frame is divided in to a plurality of blocks of encoded data values. These encoded data values are, for example, the DCT coefficients corresponding to the discrete cosine transform of luminance or chrominance of pixels. According to an embodiment of the invention, the partial decoding unit DECp comprises in series:

an entropy decoding unit VLDp, based on a variable length decoding for example, for producing a block of transformed coefficients at the second or third resolution from an encoded data block at the first resolution;

an inverse quantizing decoding unit IQp for producing a block of transformed coefficients at the second or third resolution from the block of quantized transformed coefficients; and an inverse transform unit ITp, based on an inverse discrete cosine transform IDCT for example, for producing a block of decoded coefficients at the second or third resolution from the block of transformed coefficients.

It will be apparent to a person skilled in the art that other embodiments are possible for the partial decoding unit such as the one disclosed in the prior art. This DECp unit is called partial decoding unit because it performs both a decoding and a downscaling of the encoded frames.

Figure 3:
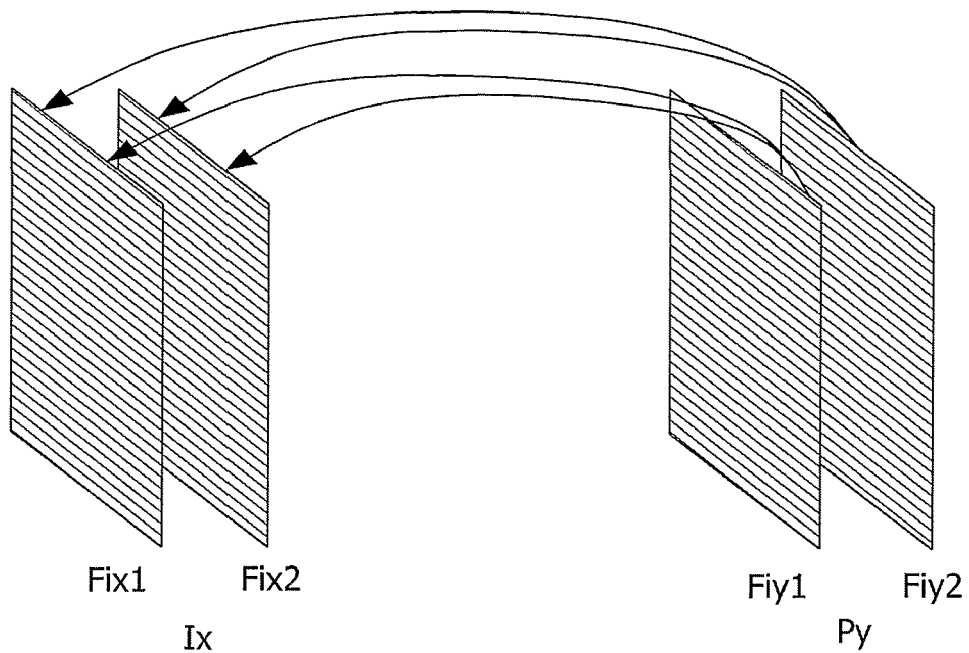
FIG. 3 illustrates field prediction according to an embodiment of the invention.

The decoding device in accordance with the invention also comprises two prediction units PRED1 and PRED2. As illustrated in FIG. 3, the first predicting unit PRED1 is adapted to produce a first motion-compensated field of a predicted frame Py based on the first residual error field, a first reference field Fix1 and/or a second reference field Fix2 of a reference frame Ix. A first adder is then adapted to combine the first residual error field with the first motion-compensated field so as to obtain a next first reference field Fiy1.

Similarly, the second predicting unit PRED2 is adapted to produce a second motion-compensated field based on the second residual error field, the first reference field Fix1 or Fiy1 and/or the second reference field Fix2. A second adder is then adapted to combine the second residual error field with the second motion-compensated field so as to obtain a next second reference field Fiy2, said next second reference field corresponding to an output frame.

In the present description, the first field is the top field and the second field is the bottom field but it will be apparent to the one skilled in the art that the first field could have been the bottom field and the second field the top field. In addition, the encoded frame is here a predicted P frame but could also be a bi-directionally predictive B frame.

Basically, the two fields of a current encoded frame are decoded at reduced resolution and only one of them is displayed. Since one field is displayed at a given time, there is no interlacing artifact. The visual quality is thus optimally adapted to the final display. Moreover, the first field is a non-displayed field, which is also decoded because it can be used as a reference for the reconstruction of a displayed one. In MPEG-2 standard, this is especially the case when "Field Motion Compensation" is applied.

Of course the second field, which is the displayed field, is decoded at the display resolution (for instance QCIF). Concerning the other field, the most natural solution is to decode it at the same resolution too. This leads to memory requirements, in terms of size and transfers, that are doubled compared with the embedded resizing solution of the prior art without de-interlacing. Since this field is never displayed but just here to predict the other one, it can be decoded to any resolution. More details are given in the following description.

For clarity purpose, the following description is based on MPEG-2 encoded bit-streams, as it is the most common compression standard in the broadcast world but it will be apparent to the one skilled in art that the encoding technique could be any block-based encoding technique (for example MPEG-2, MPEG-4, H.264, or the like).

According to a first example illustrated in FIG. 3, the decoding method is adapted to convert an interlaced standard definition SD sequence into a progressive QCIF sequence by decoding two QCIF fields.

The typical input spatial resolution is standard definition SD, which means 720×576@25 Hz (PAL) or 720×480@30 Hz (NTSC), in interlaced format. Currently, most mobile devices are equipped with a near-QCIF (progressive 180×144 or 120 pixels) screen. It implies a spatial downscaling by a ratio of 4 both in horizontal and vertical directions. We now describe in more detail the partial IDCT leading to resizing and de-interlacing and the motion compensation.

As described previously, the low-frequency content of the VLD decoded 8×8 DCT matrix is used to simulate an anti-aliasing low-pass filtering. According to third approach, the upper AC coefficients are skipped and a reduced IDCT is performed, resulting in an M×N pixel output data block instead of an 8×8 one.

Figure 5:
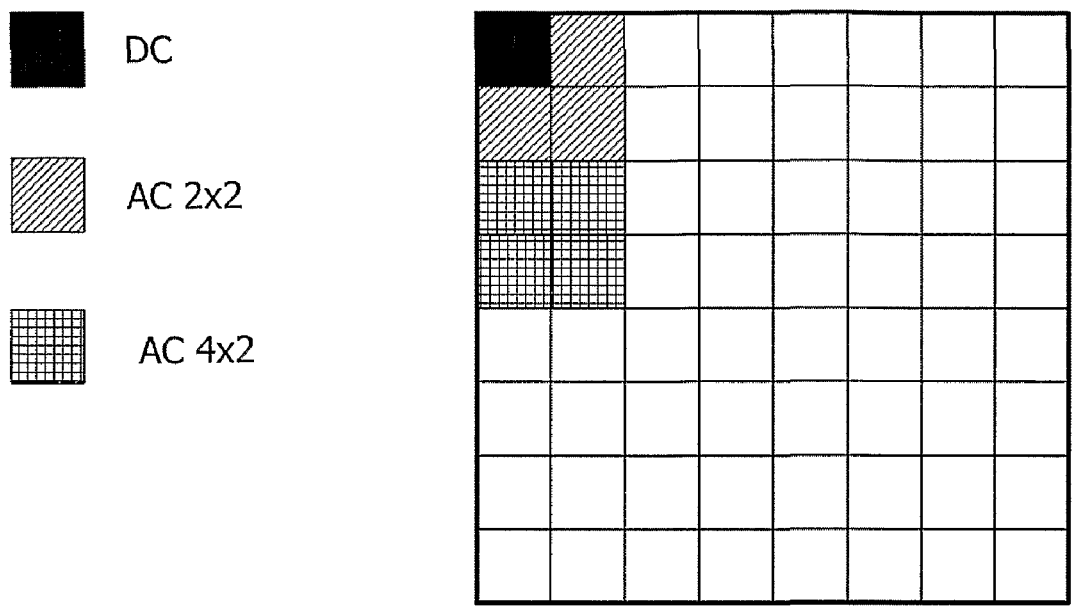
FIG. 5 illustrates the DCT coefficients extraction from a 8×8 DCT matrix.

In our case, the lower 2×2 or 4×2 coefficients of the DCT matrix are used as shown in FIG. 5, depending on the value of dct_type (Field DCT or Frame DCT) in the macro-block header. More precisely, if the interlaced macro-block of 16×16 pixels from an interlaced frame picture is Frame DCT coded, each of its four blocks has pixels from both fields. If the interlaced macro-block from an interlaced frame picture is Field DCT coded, each block consists of pixels from only one of the two fields. In the latter case, each 16×16 macro-block is split into fields 16 pixels wide×8 pixels high by taking alternating lines of pixels, then each field is split into left and right parts, making two 8×8 blocks from one field and two from the other field.

In our decoding solution, the displayed frame corresponds to one of the original fields, which is already vertically downscaled by a factor of 2 compared to the original frame. This field has then to be further downscaled by 2 in the vertical direction, and by 4 in the horizontal one so as to obtain an output progressive frame in QCIF format. If dct_type is set to 1 then a field DCT was applied at the encoder, so a 4×2 IDCT is performed. On the contrary, if dct_type is set to 0 then a frame DCT was applied at the encoder, so two 2×2 IDCT are performed with different phases, one for each field.

More precisely, from the four input 8×8 DCT matrices of a 16×16 macro-block, we derive two output 4×4 pixel blocks (one for each rescaled field). For this purpose, a modified inverse transform function, hereinafter referred to as IDCT_N×M( ), is used. Its arguments are the 8×8 DCT matrix F, the expected dimensions N×M of the output pixel block f (N vertically, M horizontally), and the vertical and horizontal phase shifts $\phi_{ver}$ and $\phi_{hor}$ that have to be applied to keep a proper pixel alignment.

The definition of IDCT_N×M is the following one (for y=0 to N−1 and x=0 to M−1):

$$f(x, y) = \frac{1}{4} \sum_{u=0}^{M-1} \sum_{v=0}^{N-1} C(u)C(v)F(u, v)\cos\left(\frac{\left(2\left(8*\frac{x}{M} + \varphi_{hor}\right)+1\right)u\pi}{2*8}\right)\cos\left(\frac{\left(2\left(8*\frac{y}{N} + \varphi_{ver}\right)+1\right)v\pi}{2*8}\right)$$

where f(x,y) represents the output pixel at position (x,y), F(u,v) represents the input DCT coefficient at position (u,v), and C(u) is defined as:

$$C(u) = \begin{cases} \frac{1}{\sqrt{2}} & \text{for } u = 0 \\ 1 & \text{otherwise} \end{cases}$$

In an embodiment of the invention, and in the case of a SD to QCIF rescaling, the following values are selected:

| Field | Frame DCT | | Field DCT | |
|---|---|---|---|---|
| | Top | Bottom | Top | Bottom |
| N | 4 | 4 | 2 | 2 |
| M | 2 | 2 | 2 | 2 |
| $\phi_{ver}$ | 0 | 2 | 0 | ½ |
| $\phi_{hor}$ | 3/2 | 3/2 | 3/2 | 3/2 |

Figure 6:
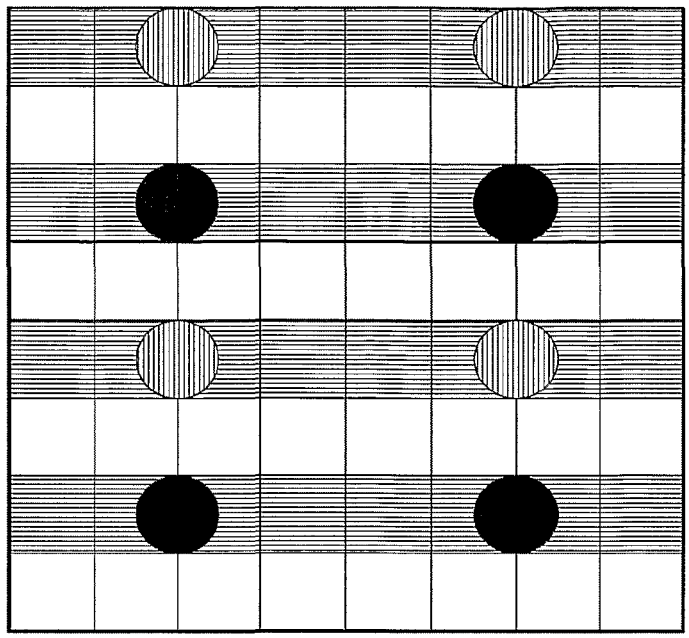
FIG. 6 illustrates the picture reconstruction in the pixel domain according to an embodiment of the invention.
Figure 6:
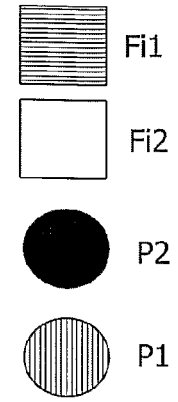

Concerning phases, their values have been determined to keep consistency between the frame IDCT and the field IDCT modes for a given field so as to keep a proper pixel alignment. The phase shift between the two fields is less critical, since said fields are never displayed together in the proposed invention. Nonetheless, phases ensuring a central position of the sub-sampled pixels on the original grid are preferred since it prevents border effects. Indeed, truncating DCT coefficients is equivalent to an ideal low-pass filtering only inside the current block. With the values of the previous table, the output pixels P1 corresponding to first field Fi1 and P2 corresponding to second field Fi2 are spatially located as shown in FIG. 6.

The motion compensation MC is derived accordingly. In particular, motion vectors are adjusted in order to take into account the phase differences between the two fields. Moreover, different approaches can be considered depending both on the motion type (Frame or Field MC) and on the motion vector value.

The strategy is straightforward in the case of Field Motion Compensation since a Boolean value explicitly gives the reference field used for prediction.

With Frame Motion Compensation, three cases are envisioned depending on the value MV·y (expressed in half-pixels in MPEG-2) of the vertical component of the original motion vector:

Case 1: MV·y modulo 4=0

In the Frame Motion Compensation process, fields remain aligned, i.e. in the original compensated frame block the lines corresponding to the top (respectively bottom) field are predicted with top (respectively bottom) field lines in the original reference frame. So in the rescaled Motion Compensation, the prediction of each field is done using only the corresponding resized reference field. Interpolation can be used to reach sub-pixel accuracy.

Case 2: MV·y modulo 4=2

In the Frame Motion Compensation process, the lines corresponding to the top (respectively bottom) field are predicted with bottom (respectively top) field lines in the original reference frame. So in the rescaled Motion Compensation, the prediction of each field is done using only the corresponding resized reference field. So in the rescaled Motion Compensation, the prediction of each field is done using only the corresponding resized reference field. Interpolation can be used to reach sub-pixel accuracy.

Case 3: otherwise:

The prediction is done by half-pixel interpolation between the two fields in the original reference frame. This is translated into an appropriate sub-pixel interpolation between the proper lines of both resized reference fields.

Figure 4:
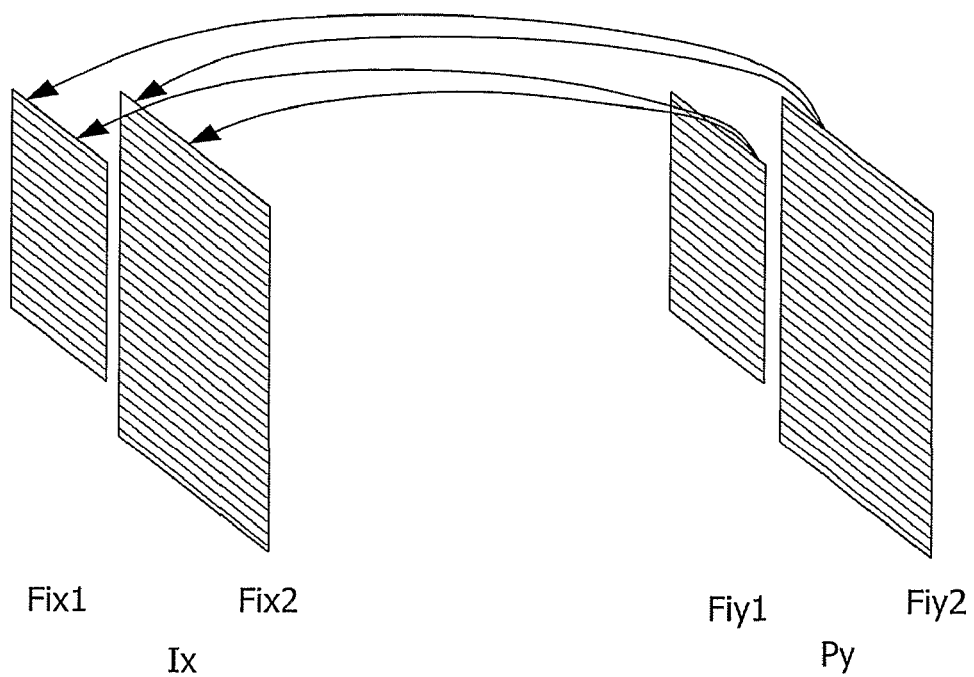
FIG. 4 illustrates field prediction according to another embodiment of the invention.

According to another example illustrated in FIG. 4, the decoding method is adapted to convert an interlaced standard definition SD sequence into a progressive QCIF sequence by decoding a first field in QCIF format and a second field in ½ QCIF format. In this embodiment of the invention, the non-displayed field is further downscaled vertically. The parameter values for IDCT_N×M are then (if the bottom field is displayed):

|  | Frame DCT | | Field DCT | |
| --- | --- | --- | --- | --- |
| Field | Top | Bottom | Top | Bottom |
| N | 2 | 4 | 1 | 2 |
| M | 2 | 2 | 2 | 2 |
| $\varphi_{ver}$ | 4 | 2 | 2 | ½ |
| $\varphi_{hor}$ | 3/2 | 3/2 | 3/2 | 3/2 |

Figure 7:
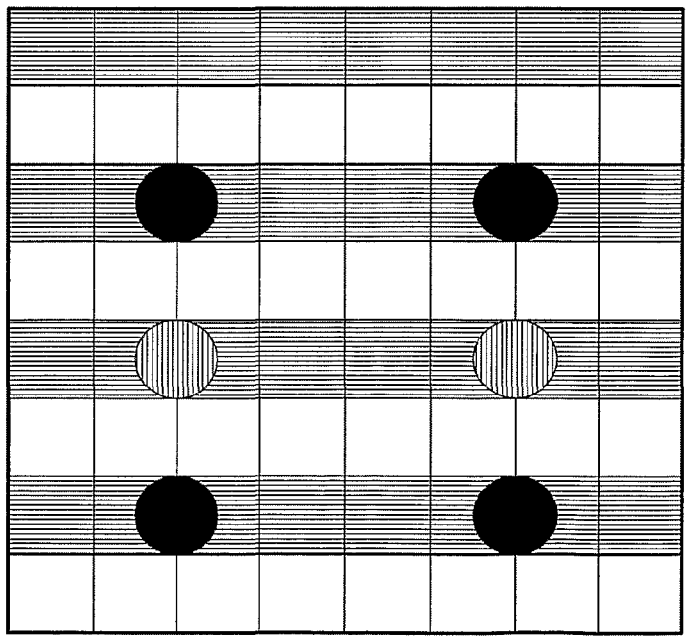
FIG. 7 illustrates the picture reconstruction in the pixel domain according to another embodiment of the invention.
Figure 7:
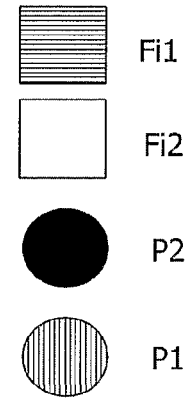

The output pixels P1 corresponding to first field Fi1 and P2 corresponding to second field Fi2 are thus spatially located as shown in FIG. 7.

The motion compensation is derived according to the new phases, and according to the new dimensions of the non-displayed field.

This embodiment is justified in applications where CPU and memory resources need to be further reduced compared to the solution described in the first example. The visual quality is slightly impaired because the non-displayed reference field is at a smaller resolution than the display, leading to blurry predictions, but the complexity of the decoding is reduced.

It will apparent to a person skilled in the art that the resolution of the non-displayed field can take other values than half the one of the displayed field. Moreover, the resolution of the non-displayed field can be made variable depending on resources (battery level, CPU, . . . ) available on the decoding device. As an example, if N=4 and M=2 for the displayed field and in the case of a Frame DCT), N×M can take the following values: 4×2, 3×2, 2×2, 1×2, 4×1, 3×1, 2×1 or 1×1 for the non-displayed field depending on the available resources.

In broadcast conditions, the spatial resolution of the encoded video sequences is not necessarily SD. Original SD sequences are often horizontally downsized before being encoded. This serves as a pre-processing stage to further reduce the final compressed bit-rate. In a normal application, such as a set-top box connected to a television set, the decoded sequences are horizontally upsized to retrieve the correct aspect ratio before being displayed.

Typical spatial resolutions are: (576 lines for PAL, 480 lines for NTSC)
SD: 720 pixels per line
¾ SD: 540 pixels per line
⅔ SD: 480 pixels per line
½ SD: 360 pixels per line In the targeted application, the proposed invention can be applied to all those formats. Similarly, the targeted progressive display can be different from QCIF (CIF or QVGA formats are already present on the market). The size of the IDCT_N×M has to be adapted and phases have to be set accordingly in order to fit as closely as possible the scaling ratio between the input and output spatial resolutions. If this ratio cannot be expressed with integer values (of the form n/8 with 8×8 DCT matrices), the preferred solution is to approximate it with the closest integer value and to crop (respectively pad) it at the rendering if the dimensions are bigger (respectively smaller) than the display resolution.

An improvement over the previously described embodiments consists in using the highest vertical components of the DCT matrix to better differentiate the two fields in case of a Frame DCT.

For instance in the case of SD (interlaced) to QCIF (progressive), the 2×2 low-frequency AC coefficients are used to generate two 2×2 pixel blocks (one for each field, with different phases). It brings interferences between the two fields, as odd lines are polluted by even lines through DCT truncation, and vice-versa. A way to overcome this issue is to use the last row of coefficients in the DCT matrix. Indeed these frequencies are representative of the difference between the odd and even lines of the original block.

Applying this better field separation brings significant visual improvement in very specific occasions, when the two fields are very different from each other (e.g. scene-cut between two fields, flash occurring only during one of the two fields, etc.). This can be implemented as an additional quality improvement tool if the available resources are large enough.

The proposed invention can be applied to any device with video capabilities that need to decode a compressed interlaced video sequence and render it at a reduced resolution on a progressive display. The invention permits to significantly reduce CPU usage, memory requirements, memory bandwidth, latency and power consumption compared to a fully sequential process, while interlacing visual artifacts are removed compared to existing simplified schemes. It is thus especially suited to DVB-T reception on mobile devices, for which resources (memory size, processing speed and energy) are limited while extended battery lifetime and good visual quality are key features and differentiating factors.

Several embodiments of the present invention have been described above by way of examples only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. A device for decoding a set of encoded frames at a first resolution so as to produce a set of progressive output frames at a lower resolution an encoded frame comprising an encoded first field interlaced with an encoded second field, said device comprising:
   a partial decoding unit for producing a first residual error field at a second resolution lower than the first one and a second residual error field at a third resolution lower than the first one based on the encoded frame;
   a first predicting unit for producing a first motion-compensated field based on the first residual error field, on a first reference field and on a second reference field
   a first adder for combining the first residual error field with the first motion-compensated field so as to obtain a next first reference field a second predicting unit for producing a second motion-compensated field based on the second residual error field, on the first reference field and on the second reference field;

a second adder for combining the second residual error field with the second motion-compensated field so as to obtain a next second reference field the next second reference field corresponding to an output frame.

2. The device of claim 1, wherein an encoded frame is divided in to a plurality of encoded data blocks and wherein the partial decoding unit comprises in series:

an entropy decoding unit for producing a block of transformed coefficients at the second or third resolution from an encoded data block at the first resolution;

an inverse quantizing decoding unit for producing a block of transformed coefficients at the second or third resolution from the block of quantized transformed coefficients; and an inverse transform unit for producing a block of decoded coefficients at the second or third resolution from the block of transformed coefficients.

3. The device of claim 1, wherein the second resolution is equal to the third resolution.

4. The device of claim 1, wherein the second resolution is variable depending on resources available on said device.

5. A portable apparatus comprising a device as claimed in claim 1 and a screen to display the set of output frames.

6. A method of decoding a set of encoded frames at a first resolution so as to produce a set of progressive output frames at a lower resolution an encoded frame comprising an encoded first field interlaced with an encoded second field, said method comprising the steps of:

producing a first residual error field at a second resolution lower than the first one based on the encoded frame;

producing a second residual error field at a third resolution lower than the first one based on the encoded frame;

producing a first motion-compensated field based on the first residual error field, on a first reference field and on a second reference field combining the first residual error field with the first motion-compensated field so as to obtain a next first reference field producing a second motion-compensated field based on the second residual error field, on the first reference field and on the second reference field;

combining the second residual error field with the second motion-compensated field so as to obtain a next second reference field (Fiy2), the next second reference field corresponding to an output frame.

7. The method of claim 6, wherein the second resolution is equal to the third resolution.

* * * * *